US011678220B2

(12) United States Patent
Hu

(10) Patent No.: US 11,678,220 B2
(45) Date of Patent: Jun. 13, 2023

(54) SYSTEMS AND METHOD OF SLOT ASSIGNMENT TO TRAFFIC STREAM

(71) Applicant: Meta Platforms Technologies, LLC, Menlo Park, CA (US)

(72) Inventor: Chunyu Hu, Saratoga, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 17/371,931

(22) Filed: Jul. 9, 2021

(65) Prior Publication Data

US 2022/0060938 A1 Feb. 24, 2022

Related U.S. Application Data

(60) Provisional application No. 63/069,547, filed on Aug. 24, 2020.

(51) Int. Cl.
*H04W 28/02* (2009.01)
*H04L 47/10* (2022.01)

(52) U.S. Cl.
CPC ......... *H04W 28/0289* (2013.01); *H04L 47/10* (2013.01)

(58) Field of Classification Search
CPC . H04W 28/0289; H04W 28/12; H04W 74/04; H04L 47/28; H04L 47/245; H04L 47/621
See application file for complete search history.

(56) References Cited

U.S. PATENT DOCUMENTS

| | | | |
|---|---|---|---|
| 2011/0141968 A1* | 6/2011 | Trainin | H04L 1/007 709/227 |
| 2021/0219186 A1* | 7/2021 | Canpolat | H04W 28/24 |
| 2021/0367716 A1* | 11/2021 | Wang | H04L 1/1887 |

OTHER PUBLICATIONS

Chunyu H., et al., "Prioritized EDCA Channel Access," IEEE Draft; 11-20-1045-02-00BE-Prioritized-EDCA-Channel-Access, IEEE-SA Mentor, Piscataway, NJ USA, vol. 802, No. 2, Aug. 22, 2020, 37 pages, [retrieved on Aug. 22, 2020], XP068172203, Retrieved from the Internet: https://mentor.ieee.org/802.11/dcn/20/11-20-1045-02-00be-prioritized-edca-channel-access.pptx.

(Continued)

*Primary Examiner* — Omer S Mian
(74) *Attorney, Agent, or Firm* — Foley & Lardner LLP

(57) ABSTRACT

Disclosed herein are systems and methods related to slot assignments to traffic streams. In one aspect, a first wireless communication device sends, to a second wireless communication device, a request message including a latency marker having a requested value. The requested value indicates that a corresponding traffic stream between the first wireless communication device and the second wireless communication device is latency sensitive. Responsive to the request message, the first wireless communication device receives, from the second wireless communication device, a response message including a response latency marker. The response latency marker includes a response value for the corresponding traffic stream. When the response value is the same as the requested value, the first wireless communication device communicates corresponding traffic stream as a prioritized traffic stream instead of a regular traffic stream, with the second wireless communication device.

16 Claims, 5 Drawing Sheets

(56) References Cited

OTHER PUBLICATIONS

"Draft standard for Information Technology-Tele-Communications and Information Exchange between systems Local and metropolitan area networks—Specific requirements ? ? Part 11: Wireless LAN Medium Access Control ? (MAC) anc Physical Layer (PHY) Specifications ? ? Amendment 8: Enhancements for extre," Working Group of the LAN/MAN Standards Committee of the IEEE Computersociety:, IEEE Draft; Draft P802.11BE_D1.01, IEEE-SA, Piscataway, NJ USA, vol. 802, Jun. 30, 2021, [retrieved on Jun. 30, 2021], 2 pages, Retrieved from the Internet: http://www.ieee802.org/11/private/Draft_standars/11be/Draft%20P802.11beD1.01.pdf.
International Search Report and Written Opinion for International Application No. PCT/US2021/046099, dated Dec. 10, 2021, 10 pages.
Patil A., et al., "Multi-TID MLBA Negotiation," IEEE Draft; 11-20-0914-00-00BE-Multi-TID-ML-BA-Negotiation, IEEE-SA Mentor, Piscataway, NJ USA, vol. 802, Aug. 16, 2020, [retrieved on Aug. 16, 2020], 18 pages, Retrieved from the Internet: https://mentor.ieee.org/802.11/dcn/20/11-20-0914-00-00be-multi-tid-ml-ba-negotiation.pptx.

* cited by examiner

SYSTEMS AND METHOD OF SLOT ASSIGNMENT TO TRAFFIC STREAM

CROSS-REFERENCE TO RELATED APPLICATION

This application claims priority to and the benefit of U.S. Provisional Application No. 63/069,547, filed Aug. 24, 2020, entitled "SLOT ASSIGNMENT TO TRAFFIC STREAM", which is incorporated herein by reference in its entirety for all purposes.

FIELD OF DISCLOSURE

The present disclosure is generally related to communications, including but not limited systems and methods of slot assignment to traffic stream.

BACKGROUND

Artificial reality such as a virtual reality (VR), an augmented reality (AR), or a mixed reality (MR) provides immersive experience to a user. In one example, a user wearing a head wearable display (HWD) can turn the user's head, and an image of a virtual object corresponding to a location of the HWD and a gaze direction of the user can be displayed on the HWD to allow the user to feel as if the user is moving within a space of artificial reality (e.g., a VR space, an AR space, or a MR space). An image of a virtual object may be generated by a console communicatively coupled to the HWD. In some embodiments, the console may have access to a network.

SUMMARY

Disclosed herein are systems and methods related to slot assignment to traffic streams. Resources and/or time slots can be adaptively allocated for communication of traffic based on utilization and/or priorities of channel access. The communication of traffic associated with latency sensitive applications and/or latency sensitive links may be prioritized over regular traffic. The prioritization of latency sensitive traffic (or traffic streams) can improve the quality of service of latency sensitive applications and/or traffic.

Some embodiments are related to a method of sending, by a first wireless communication device to a second wireless communication device, a request message comprising a latency marker having a requested value indicating that a corresponding traffic stream between the first wireless communication device and the second wireless communication device is latency sensitive; and receiving, by the first wireless communication device from the second wireless communication device responsive to the request message, a response message comprising a response latency marker with a response value for the corresponding traffic stream; and communicating, by the first wireless communication device with the second wireless communication device, the corresponding traffic stream as a prioritized traffic stream instead of a regular traffic stream, when the response value is same as the requested value.

In some embodiments, the request message includes a traffic stream identifier (TID) of the corresponding traffic stream, and the requested value is configured for the TID of the corresponding traffic stream. In certain embodiments, the corresponding traffic stream has a specific direction (e.g., uplink or downlink) between the first wireless communication device and the second wireless communication device, and the requested value is configured for the specific direction. In one example, the latency marker may have a first requested value indicating whether a first traffic stream of a first direction (e.g., uplink) between the first wireless communication device and the second wireless communication device is latency sensitive, and a second requested value indicating whether a second traffic stream of a second direction (e.g., downlink) between the first wireless communication device and the second wireless communication device is latency sensitive.

In some embodiments, the request message is used to establish a block acknowledgement (BA) session, and the latency marker is 1 bit in size. The latency marker may include a plurality of requested values each indicating whether a corresponding traffic stream between the first wireless communication device and the second wireless communication device is latency sensitive. The response latency marker may include a plurality of response values each responsive to a corresponding one of the plurality of requested values. In some embodiments, the latency marker comprises a bitmap, each bit of the bitmap indicating whether a corresponding traffic stream between the first wireless communication device and the second wireless communication device is latency sensitive. In some implementations, the latency marker comprises a first bitmap indicating whether each of a first plurality of traffic streams with a first direction between the first wireless communication device and the second wireless communication device is latency sensitive, and a second bitmap indicating whether each of a second plurality of traffic streams with a second direction between the first wireless communication device and the second wireless communication device is latency sensitive. In some embodiments, at least one of the latency marker or the response latency marker is configured in or as an information element. The latency marker may be carried in a field of the request message, or the response latency marker may be carried in a field of the response message.

Other embodiments are related to a first wireless communication device, comprising: a transceiver comprising at least one processor, configured to: send to a second wireless communication device a request message comprising a latency marker having a requested value indicating that a corresponding traffic stream between the first wireless communication device and the second wireless communication device is latency sensitive; and receive, from the second wireless communication device responsive to the request message, a response message comprising a response latency marker with a response value for the corresponding traffic stream; and communicate, with the second wireless communication device, the corresponding traffic stream as a prioritized traffic stream instead of a regular traffic stream, when the response value is same as the requested value.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Figure 1:
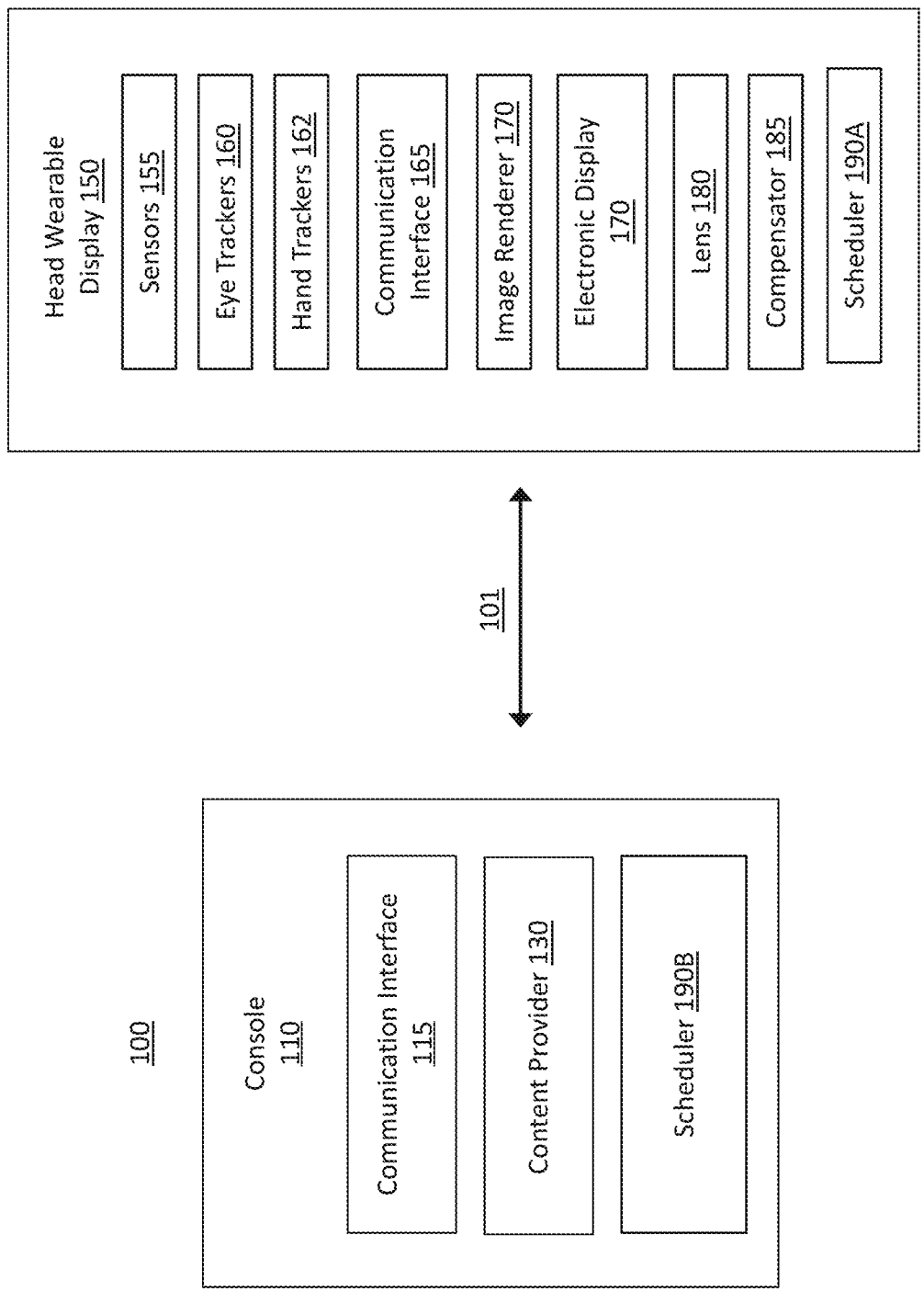
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Streams of traffic may be characterized by different types of traffic. For instance, an application may be characterized by latency sensitive traffic (e.g., video/voice (VI/VO), real time interactive applications, and the like) or regular traffic (e.g., best effort/background applications (BE/BK)). Latency sensitive traffic may be identifiable, in part, based on its bursty nature (e.g., periodic bursts of traffic), in some embodiments. For instance, video display traffic may be driven by a refresh rate of 60 Hz, 72 Hz, 90 Hz, or 120 Hz. An application and/or device may have combinations of traffic types (e.g., latency sensitive traffic and non latency sensitive traffic). Further, each stream of traffic for the application and/or device may be more or less spontaneous and/or aperiodic as compared to the other streams of traffic for the application and/or device. Accordingly, traffic may vary according to applications and/or channel rate dynamics.

In some implementations, devices may communicate using allocated channel transmission bandwidth such that only admitted (e.g., registered or assigned) devices have access to the channel. In other implementations, devices may communicate using broadcast transmissions. Each frame used in communication may include subframes or slots, which further includes data symbols.

Devices configured to support multi-link operation (MLO) may be capable of supporting flexible traffic steering and load balancing. In some implementations, devices may load balance different links by differentiating the services of the links. For example, a device (such as an access point (AP)) may direct a station (STA) carrying latency sensitive traffic to operate over one link or a subset of links.

Assigning slots to traffic streams improves the quality of service for latency sensitive applications by dedicating and allocating slots in links to latency sensitive traffic. A device (AP, soft AP, console) may configure latency sensitive slots such that the latency sensitive slots are prioritized over regular slots. A device (such as a STA or AP) may classify/identify each of the traffic streams according to source/destination address/identification and/or on a per traffic identifier (TID) basis using an attribute (e.g., an L-marker). A TID may comprise an identifier to identify a traffic stream. Traffic identified as latency sensitive (e.g., having a defined latency requirement, for instance to be within a specific latency range or below a defined latency threshold) may be communicated using a latency sensitive slot, for example.

In some applications, latency sensitive traffic that is not prioritized may degrade a user experience. For example, in an AR context, latency between a movement of a user wearing an AR device and an image corresponding to the user movement and displayed to the user using the AR device may cause judder, resulting in motion sickness.

FIG. 1 is a block diagram of an example artificial reality system environment 100 in which a console 110 operates. FIG. 1 provides an example environment in which devices may communicate traffic streams with different latency sensitivities/requirements. In some embodiments, the artificial reality system environment 100 includes a HWD 150 worn by a user, and a console 110 providing content of artificial reality to the HWD 150. A head wearable display (HWD) may be referred to as, include, or be part of a head mounted display (HMD), head mounted device (HMD), head wearable device (HWD), head worn display (HWD) or head worn device (HWD). In one aspect, the HWD 150 may include various sensors to detect a location, an orientation, and/or a gaze direction of the user wearing the HWD 150, and provide the detected location, orientation and/or gaze direction to the console 110 through a wired or wireless connection. The HWD 150 may also identify objects (e.g., body, hand face).

The console 110 may determine a view within the space of the artificial reality corresponding to the detected location, orientation and/or the gaze direction, and generate an image depicting the determined view. The console 110 may also receive one or more user inputs and modify the image according to the user inputs. The console 110 may provide the image to the HWD 150 for rendering. The image of the space of the artificial reality corresponding to the user's view can be presented to the user. In some embodiments, the artificial reality system environment 100 includes more, fewer, or different components than shown in FIG. 1. In some embodiments, functionality of one or more components of the artificial reality system environment 100 can be distributed among the components in a different manner than is described here. For example, some of the functionality of the console 110 may be performed by the HWD 150, and/or some of the functionality of the HWD 150 may be performed by the console 110.

In some embodiments, the HWD 150 is an electronic component that can be worn by a user and can present or provide an artificial reality experience to the user. The HWD 150 may render one or more images, video, audio, or some combination thereof to provide the artificial reality experience to the user. In some embodiments, audio is presented via an external device (e.g., speakers and/or headphones) that receives audio information from the HWD 150, the console 110, or both, and presents audio based on the audio information. In some embodiments, the HWD 150 includes sensors 155, eye trackers 160, a communication interface 165, an image renderer 170, an electronic display 175, a lens 180, and a compensator 185. These components may operate together to detect a location of the HWD 150 and/or a gaze direction of the user wearing the HWD 150, and render an image of a view within the artificial reality corresponding to the detected location of the HWD 150 and/or the gaze direction of the user. In other embodiments, the HWD 150 includes more, fewer, or different components than shown in FIG. 1.

In some embodiments, the sensors 155 include electronic components or a combination of electronic components and software components that detect a location and/or an orientation of the HWD 150. Examples of sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and/or the rotational movement, and determine an orientation and location of the HWD 150. In one aspect, the sensors 155 can detect the translational movement and/or the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the eye trackers 160 include electronic components or a combination of electronic components and software components that determine a gaze direction of the user of the HWD 150. In some embodiments, the HWD 150, the console 110 or a combination may incorporate the gaze direction of the user of the HWD 150 to generate image data for artificial reality. In some embodiments, the eye trackers 160 include two eye trackers, where each eye tracker 160 captures an image of a corresponding eye and determines a gaze direction of the eye. In one example, the eye tracker 160 determines an angular rotation of the eye, a translation of the eye, a change in the torsion of the eye, and/or a change in shape of the eye, according to the captured image of the eye, and determines the relative gaze direction with respect to the HWD 150, according to the determined angular rotation, translation and the change in the torsion of the eye. In one approach, the eye tracker 160 may shine or project a predetermined reference or structured pattern on a portion of the eye, and capture an image of the eye to analyze the pattern projected on the portion of the eye to determine a relative gaze direction of the eye with respect to the HWD 150. In some embodiments, the eye trackers 160 incorporate the orientation of the HWD 150 and the relative gaze direction with respect to the HWD 150 to determine a gaze direction of the user. Assuming for an example that the HWD 150 is oriented at a direction 30 degrees from a reference direction, and the relative gaze direction of the HWD 150 is −10 degrees (or 350 degrees) with respect to the HWD 150, the eye trackers 160 may determine that the gaze direction of the user is 20 degrees from the reference direction. In some embodiments, a user of the HWD 150 can configure the HWD 150 (e.g., via user settings) to enable or disable the eye trackers 160. In some embodiments, a user of the HWD 150 is prompted to enable or disable the eye trackers 160.

In some embodiments, the hand tracker 162 includes an electronic component or a combination of an electronic component and a software component that tracks a hand of the user. In some embodiments, the hand tracker 162 includes or is coupled to an imaging sensor (e.g., camera) and an image processor that can detect a shape, a location and/or an orientation of the hand. The hand tracker 162 may generate hand tracking measurements indicating the detected shape, location and/or orientation of the hand.

In some embodiments, the communication interface 165 includes an electronic component or a combination of an electronic component and a software component that communicates with the console 110. The communication interface 165 may communicate with a communication interface 115 of the console 110 through a communication link. The communication link may be a wireless link, a wired link, or both. Examples of the wireless link can include a cellular communication link, a near field communication link, Wi-Fi, Bluetooth, or any communication wireless communication link. Examples of the wired link can include a USB, Ethernet, Firewire, HDMI, or any wired communication link. In embodiments in which the console 110 and the head wearable display 150 are implemented on a single system, the communication interface 165 may communicate with the console 110 through a bus connection or a conductive trace. Through the communication link, the communication interface 165 may transmit to the console 110 sensor measurements indicating the determined location of the HWD 150, orientation of the HWD 150, the determined gaze direction of the user, and/or hand tracking measurements. Moreover, through the communication link, the communication interface 165 may receive from the console 110 sensor measurements indicating or corresponding to an image to be rendered.

Using the communication interface, the console 110 (or HWD 150) may coordinate operations on link 101 to reduce collisions or interferences. For example, the console 110 may coordinate communication between the console 110 and the HWD 150. In some implementations, the console 110 may transmit a beacon frame periodically to announce/advertise a presence of a wireless link between the console 110 and the HWD 150 (or between two HWDs). In an implementation, the HWD 150 may monitor for or receive the beacon frame from the console 110, and can schedule communication with the HWD 150 (e.g., using the information in the beacon frame, such as an offset value) to avoid collision or interference with communication between the console 110 and/or HWD 150 and other devices.

The console 110 and HWD 150 may communicate using link 101 (e.g., intralink). Data (e.g., a traffic stream) may flow in a direction on link 101. For example, the console 110 may communicate using a downlink (DL) communication to the HWD 150 and the HWD 150 may communicate using an uplink (UL) communication to the console 110.

In some embodiments, the image renderer 170 includes an electronic component or a combination of an electronic component and a software component that generates one or more images for display, for example, according to a change in view of the space of the artificial reality. In some embodiments, the image renderer 170 is implemented as a processor (or a graphical processing unit (GPU)) that executes instructions to perform various functions described herein. The image renderer 170 may receive, through the communication interface 165, data describing an image to be rendered, and render the image through the electronic display 175. In some embodiments, the data from the console 110 may be encoded, and the image renderer 170 may decode the data to generate and render the image. In one aspect, the image renderer 170 receives the encoded image from the console 110, and decodes the encoded image, such that a communication bandwidth between the console 110 and the HWD 150 can be reduced.

In some embodiments, the image renderer 170 receives, from the console, 110 additional data including object information indicating virtual objects in the artificial reality space and depth information indicating depth (or distances from the HWD 150) of the virtual objects. Accordingly, the image renderer 170 may receive from the console 110 object information and/or depth information. The image renderer 170 may also receive updated sensor measurements from the sensors 155. The process of detecting, by the HWD 150, the location and the orientation of the HWD 150 and/or the gaze direction of the user wearing the HWD 150, and generating and transmitting, by the console 110, a high resolution image (e.g., 1920 by 1080 pixels, or 2048 by 1152 pixels) corresponding to the detected location and the gaze direction to the HWD 150 may be computationally exhaustive and may not be performed within a frame time (e.g., less than 11 ms or 8 ms).

In some implementations, the image renderer 170 may perform shading, reprojection, and/or blending to update the image of the artificial reality to correspond to the updated location and/or orientation of the HWD 150. Assuming that a user rotated their head after the initial sensor measurements, rather than recreating the entire image responsive to the updated sensor measurements, the image renderer 170 may generate a small portion (e.g., 10%) of an image corresponding to an updated view within the artificial reality according to the updated sensor measurements, and append the portion to the image in the image data from the console 110 through reprojection. The image renderer 170 may perform shading and/or blending on the appended edges. Hence, without recreating the image of the artificial reality according to the updated sensor measurements, the image renderer 170 can generate the image of the artificial reality.

In other implementations, the image renderer 170 generates one or more images through a shading process and a reprojection process when an image from the console 110 is not received within the frame time. For example, the shading process and the reprojection process may be performed adaptively, according to a change in view of the space of the artificial reality.

In some embodiments, the electronic display 175 is an electronic component that displays an image. The electronic display 175 may, for example, be a liquid crystal display or an organic light emitting diode display. The electronic display 175 may be a transparent display that allows the user to see through. In some embodiments, when the HWD 150 is worn by a user, the electronic display 175 is located proximate (e.g., less than 3 inches) to the user's eyes. In one aspect, the electronic display 175 emits or projects light towards the user's eyes according to image generated by the image renderer 170.

In some embodiments, the lens 180 is a mechanical component that alters received light from the electronic display 175. The lens 180 may magnify the light from the electronic display 175, and correct for optical error associated with the light. The lens 180 may be a Fresnel lens, a convex lens, a concave lens, a filter, or any suitable optical component that alters the light from the electronic display 175. Through the lens 180, light from the electronic display 175 can reach the pupils, such that the user can see the image displayed by the electronic display 175, despite the close proximity of the electronic display 175 to the eyes.

In some embodiments, the compensator 185 includes an electronic component or a combination of an electronic component and a software component that performs compensation to compensate for any distortions or aberrations. In one aspect, the lens 180 introduces optical aberrations such as a chromatic aberration, a pin-cushion distortion, barrel distortion, etc. The compensator 185 may determine a compensation (e.g., predistortion) to apply to the image to be rendered from the image renderer 170 to compensate for the distortions caused by the lens 180, and apply the determined compensation to the image from the image renderer 170. The compensator 185 may provide the pre-distorted image to the electronic display 175.

In some embodiments, the console 110 is an electronic component or a combination of an electronic component and a software component that provides content to be rendered to the HWD 150. In one aspect, the console 110 includes a communication interface 115 and a content provider 130. These components may operate together to determine a view (e.g., a field of view (FOV) of the user) of the artificial reality corresponding to the location of the HWD 150 and/or the gaze direction of the user of the HWD 150, and can generate an image of the artificial reality corresponding to the determined view. In other embodiments, the console 110 includes more, fewer, or different components than shown in FIG. 1. In some embodiments, the console 110 is integrated as part of the HWD 150. In some embodiments, the communication interface 115 is an electronic component or a combination of an electronic component and a software component that communicates with the HWD 150. The communication interface 115 may be a counterpart component to the communication interface 165 to communicate with a communication interface 115 of the console 110 through a communication link (e.g., USB cable, a wireless link). Through the communication link, the communication interface 115 may receive from the HWD 150 sensor measurements indicating the determined location and/or orientation of the HWD 150, the determined gaze direction of the user, and/or hand tracking measurements. Moreover, through the communication link, the communication interface 115 may transmit to the HWD 150 data describing an image to be rendered.

The content provider 130 can include or correspond to a component that generates content to be rendered according to the location and/or orientation of the HWD 150, the gaze direction of the user and/or hand tracking measurements. In one aspect, the content provider 130 determines a view of the artificial reality according to the location and orientation of the HWD 150 and/or the gaze direction of the user of the HWD 150. For example, the content provider 130 maps the location of the HWD 150 in a physical space to a location within an artificial reality space, and determines a view of the artificial reality space along a direction corresponding to an orientation of the HWD 150 and/or the gaze direction of the user from the mapped location in the artificial reality space.

The content provider 130 may generate image data describing an image of the determined view of the artificial reality space, and transmit the image data to the HWD 150 through the communication interface 115. The content provider may also generate a hand model (or other virtual object) corresponding to a hand of the user according to the hand tracking measurement, and generate hand model data indicating a shape, a location, and an orientation of the hand model in the artificial reality space.

In some embodiments, the content provider 130 generates metadata including motion vector information, depth information, edge information, object information, etc., associated with the image, and transmits the metadata with the image data to the HWD 150 through the communication interface 115. The content provider 130 may encode and/or encode the data describing the image, and can transmit the encoded and/or encoded data to the HWD 150. In some embodiments, the content provider 130 generates and provides the image to the HWD 150 periodically (e.g., every one second).

The scheduler 190A of the HWD 150 and the scheduler 190B of the console (hereinafter referred to as "scheduler 190") may be used to facilitate communication between the HWD 150 and the console 110. For example, the HWD 150 and/or console 110 may access link 101 based on a scheduled agreement. The scheduler 190 may communicate traffic such that the HWD 150 and console 110 (or console 110 and other device, or HWD 150 and other device), may agree on a distribution of traffic/slots of link 101. The scheduler 190 may also facilitate agreements involving the distribution of carriers and sub-carriers of link 101. The scheduler 190 may be used to assign (identify, or classify) traffic based on access categories, TIDs, source/destinations, the direction of traffic (e.g., UL/DL), and/or a predicted traffic pattern (e.g., the expected traffic originating from the device and/or application, traffic expected by the device and/or application, and/or expected peer-to-peer traffic).

Upon agreeing to latency sensitive traffic using the scheduler 190, the console 110 and/or HWD 150 may communicate the latency sensitive traffic using a latency sensitive slot (e.g., a prioritized slot) to transmit a portion of the traffic identified as being latency sensitive. The console 110 and/or HWD 150 may also access any of the regular (or non-prioritized) slots for portions of the traffic identified as being regular (non latency sensitive) traffic.

In addition, the scheduler 190 may schedule (e.g., assign, or allocate) particular slot locations as latency sensitive slots. In an example, the scheduler 190 may schedule latency sensitive slots in a cyclic pattern among slots for regular traffic. Additionally or alternatively, scheduler 190 may schedule multiple contiguous slots (e.g., a service period of latency sensitive slots) as latency sensitive slots.

In an example, if the console 110 and/or HWD is configured for multi-link operation (MLO), the scheduler 190 may schedule one set of TIDs to a subset of links, and schedule a different set of TIDs to a different subset of links. Additionally or alternatively, the scheduler 190 may dedicate a subset of links for UL triggering/traffic and dedicate a different subset of links for other traffic (e.g., DL triggering/traffic).

Figure 2:
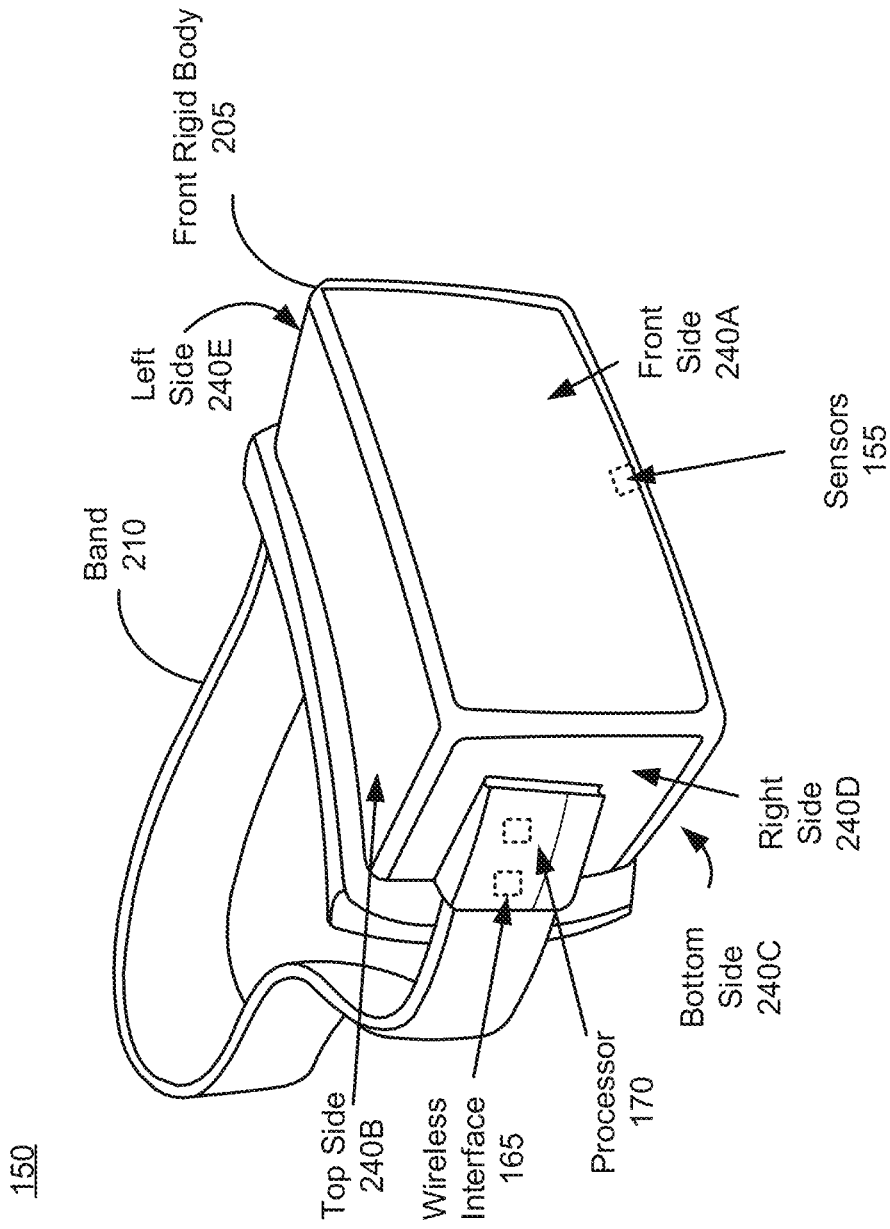
FIG. 2 is a diagram of a head wearable display, according to an example implementation of the present disclosure.

FIG. 2 is a diagram of a HWD 150, in accordance with an example embodiment. In some embodiments, the HWD 150 includes a front rigid body 205 and a band 210. The front rigid body 205 includes the electronic display 175 (not shown in FIG. 2), the lens 180 (not shown in FIG. 2), the sensors 155, the eye trackers 160A, 160B, the communication interface 165, and the image renderer 170. In the embodiment shown by FIG. 2, the sensors 155 are located within the front rigid body 205, and may not visible to the user. In other embodiments, the HWD 150 has a different configuration than shown in FIG. 2. For example, the image renderer 170, the eye trackers 160A, 160B, and/or the sensors 155 may be in different locations than shown in FIG. 2.

Figure 3:
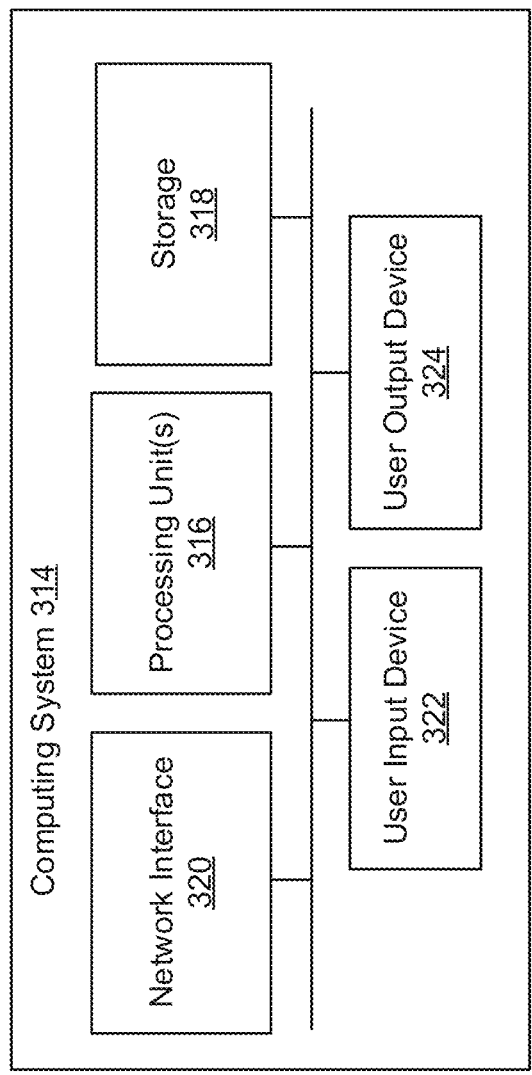
FIG. 3 is a block diagram of a computing environment according to an example implementation of the present disclosure.

Various operations described herein can be implemented on computer systems. FIG. 3 shows a block diagram of a representative computing system 314 usable to implement the present disclosure. In some embodiments, the console 110, the HWD 150 or both of FIG. 1 are implemented by the computing system 314. Computing system 314 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 314 can be implemented to provide VR, AR, MR experience. In some embodiments, the computing system 314 can include conventional computer components such as processors 316, storage device 318, network interface 320, user input device 322, and user output device 324.

Network interface 320 can provide a connection to a wide area network (e.g., the Internet) to which WAN interface of a remote server system is also connected. Network interface 320 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

The network interface 320 may include a transceiver to allow the computing system 314 to transmit and receive data from a remote device (e.g., an AP, a STA) using a transmitter and receiver. The transceiver may be configured to support transmission/reception supporting industry standards that enables bi-directional communication. An antenna may be attached to transceiver housing and electrically coupled to the transceiver. Additionally or alternatively, a multi-antenna array may be electrically coupled to the transceiver such that a plurality of beams pointing in distinct directions may facilitate in transmitting and/or receiving data.

A transmitter may be configured to wirelessly transmit frames, slots, or symbols generated by the processor unit 316. Similarly, a receiver may be configured to receive frames, slots or symbols and the processor unit 316 may be configured to process the frames. For example, the processor unit 316 can be configured to determine a type of frame and to process the frame and/or fields of the frame accordingly.

User input device 322 can include any device (or devices) via which a user can provide signals to computing system 314; computing system 314 can interpret the signals as indicative of particular user requests or information. User input device 322 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 324 can include any device via which computing system 314 can provide information to a user. For example, user output device 324 can include a display to display images generated by or delivered to computing system 314. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 324 can be provided in addition to or instead of a display. Examples include indicator lights, speakers, tactile "display" devices, printers, and so on.

Figure 4:
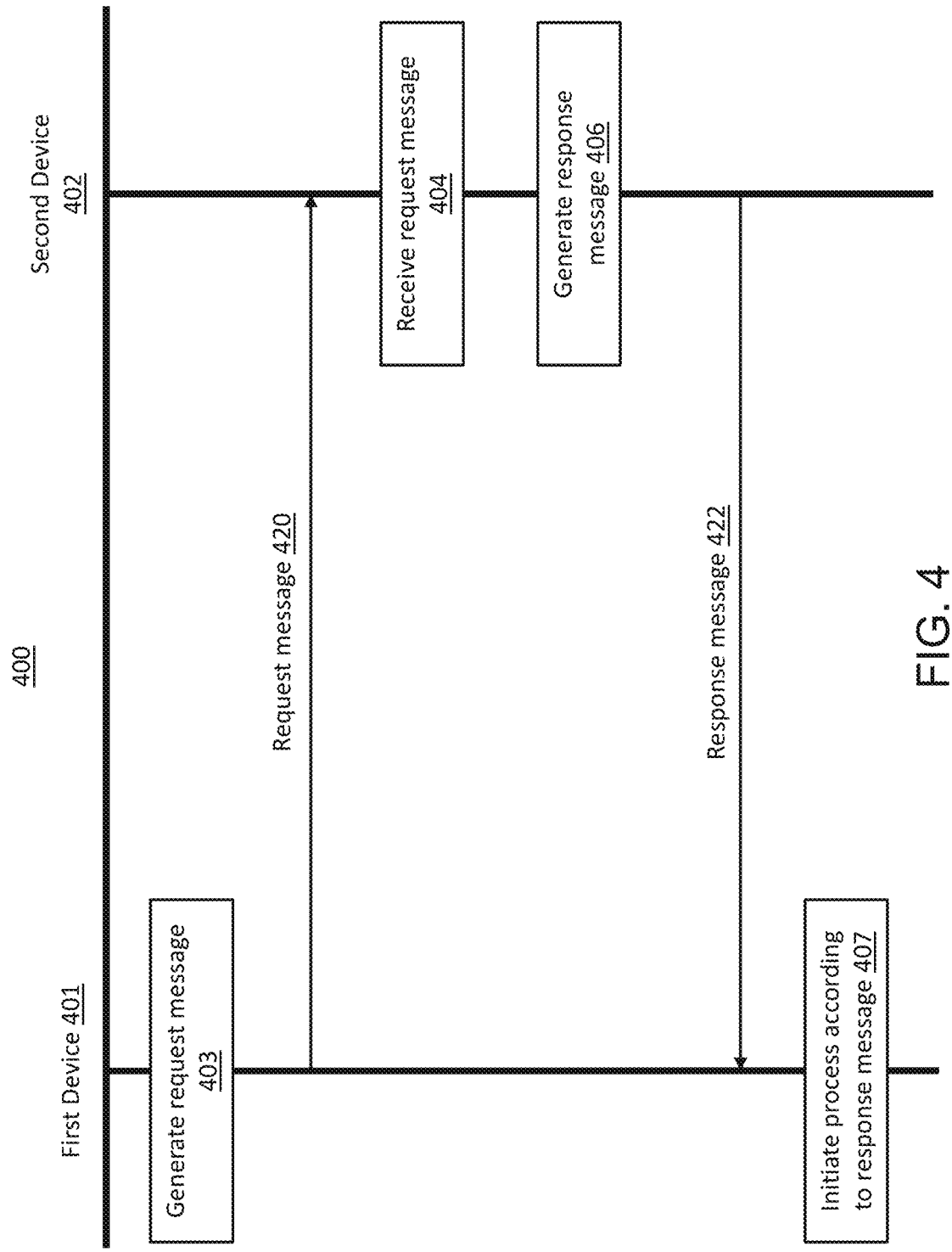
FIG. 4 is an interaction/flow diagram showing a process of communicating slot assignment of at least one traffic stream between two devices, according to an example implementation of the present disclosure.

FIGS. 1-2 illustrate devices that communicate traffic streams some of which may be latency sensitive (e.g., those carrying AR/VR information/content). FIG. 4 is an interaction/flow diagram showing a process 400 of communicating slot assignment(s) of traffic stream(s) between two devices, according to an example implementation of the present disclosure. In some embodiments, the process 400 is performed by a first device 401 and a second device 402. The first device 401 and second device 402 may be some combination of an AP (e.g., console 110, router), a soft AP, and/or a station (e.g., HWD 150). In some embodiments, the process 400 is performed by other entities. In some embodiments, the process 400 includes more, fewer, or different steps than shown in FIG. 4.

In more details of operation 403, the first device 401 may generate a request message with one or more request values. A value in the request message (e.g., a request value in the request message) may be a value corresponding to a traffic stream and/or the traffic stream's TID. In at least one field of the request message, the device (e.g., first device 401 and/or second device 402) may configure/include a latency marker (L-marker) with a value (e.g., a request value) to identify one or more traffic streams. In other embodiments, the request message may include a different marker having a request value to identify one or more traffic streams using a different characteristic/attribute of the traffic stream. For example, other types of data may be prioritized using other markers.

The L-marker may be one bit in length/size, in some embodiments. For example, the L-marker (e.g., a request value of the L-marker) may indicate whether a TID is associated with latency sensitive traffic. As discussed herein, the L-marker may be used to indicate and distinguish latency sensitive traffic (e.g., prioritized traffic) over regular traffic (e.g., non-prioritized traffic, regular traffic). If the L-marker is set to '1' (or '0'), the corresponding TID may be associated with latency sensitive traffic, and if the L-marker is set to '0' (or '1') the TID may be associated with regular traffic.

One or more values, (e.g., a request value) may indicate whether a traffic stream is latency sensitive. In some implementations, values (e.g., a request value) of the L-marker may be one bit. In other implementations, values (e.g., request values) of the L-marker may be multiple bits.

If the L-marker includes multiple bits (e.g., a bitmap of k bits), then in some implementations, each of the k bits of the bitmap may indicate whether a corresponding traffic stream communicated (e.g., in UL or DL) or to be communicated between the first device 401 and the second device 402, is latency sensitive. The L-marker may also include other bits in the bitmap (e.g., management bit(s)). In the event the L-marker is multiple bits, the L-marker may indicate (or distinguish between) various types of traffic using various characteristics (or attributes) of the traffic. For example, an L-marker/value of the L-marker may in some embodiments distinguish at least four types of traffic (e.g., prioritized traffic, preferred traffic, regular traffic).

The L-marker may also indicate a specific direction of traffic between the first device 401 and the second device 402. For example, the L-marker may indicate whether a traffic stream should be communicated in UL and/or DL traffic.

In some implementations, the L-marker may contain/include a first value (e.g., a first request value) indicating whether a first traffic stream in a first direction between the first device 401 and the second device 402 is latency sensitive. A second value of the L-marker (e.g., a second request value) may indicate whether a second traffic stream in a second direction between the first device 401 and the second device 402 is latency sensitive. For instance a particular stream of UL traffic may be latency sensitive and a particular stream of DL traffic may be latency sensitive.

The L-marker may indicate/include a first bitmap (e.g., 2 bytes or 16 bits) of first values (e.g., request values) that indicates a direction of traffic (e.g., UL) between the first device 401 and the second device 402, and whether corresponding traffic streams are latency sensitive. The first bitmap may include one management bit and/or one defined bit to indicate whether all identified traffic streams are latency sensitive. The L-marker may also indicate/include a second bitmap (e.g., 2 bytes or 16 bits) of second values (e.g., second request values) that indicates a direction of traffic (e.g., DL) between the second device 402 and the first device 401, and whether other corresponding traffic streams are latency sensitive. The second bitmap may include one management bit and/or one defined bit to indicate whether all identified traffic streams are latency sensitive. In some implementations, the first bitmap and second bitmap are contiguous (e.g., being portions of a larger bitmap). In some implementations, the contiguous nature of the bitmaps may indicate a first direction (e.g., UL) associated with the first bitmap, and a second direction (e.g., DL) associated with the second bitmap.

In more details of operation 420, the first device 401 may transmit the request message to the second device 402. For example, the first device 401 may transmit the request message (e.g., an add block acknowledgement (ADDBA) request frame) as part of a handshake process for establishment of a block acknowledgement (BA) session. A bit may be appended/added/repurposed in a field (or information element) to indicate whether the traffic corresponding to the BA is latency sensitive. For example, a sub-field may indicate whether a TID to be aggregated in a BA session is a latency sensitive TID. The L-marker may comprise/set only one bit, because the ADDBA request frame (or response frame) is configured/established for a TID specified in the BA parameter set.

In some implementations, the L-marker may be configured in (or as an) information element (IE). For example, the IE may be a latency sensitive traffic identifier/description/configuration used in (appended to, repurposed for, inserted in) other protocols, including the BA establishment session as discussed herein. The IE may be configured/defined with header information such as element ID information (which may be 1 byte or other number of bytes/bits long), IE length (which may be 1 byte or other number of bytes/bits long), and/or Element ID Extension (which may be 1 byte or other number of bytes/bits long). The IE may also include the L-marker bitmap, as described herein. The L-marker bitmap may be 2 bytes (or other number of bytes/bits long). The IE may be represented for example, by:

|Element ID (1 byte)|Length (1 byte)|Element ID Extension (1 byte)|L-Marker bitmap (2 bytes)=

As example, the first device 401 may transmit the request message (with the IE) as any type of handshake action frame. For instance, a negotiation process (such as process 400) may be executed using the IE in one or more messages that are communicated within the negotiation process.

Additionally or alternatively, the first device 401 may transmit an L-marker as/in a field in a request message. For example, the request message can be a slot request frame as part of a slot request handshake (or in other protocols/process that exchange frames for negotiation or to achieve agreements). That is, one or more bits in a field of the request handshake frame may be appended/incorporated/configured/modified such that the request handshake frame conveys latency sensitivity information. In an example, the L-marker IE/field (or bitmap) may be appended/incorporated/configured in the slot request handshake frame.

In more details of operation 404, the second device 402 may receive the request message transmitted by the first device 401. The second device 402 may extract information from the request message such as L-marker information. In operation 406, the second device 402 may generate a response message in response to the received information extracted from the request message (e.g., including the L-marker information). For example, the response message may comprise an ADDBA response frame (sent in response to the ADDBA request frame), as part of the handshake process for establishment of a BA session. In another example, the response message may comprise a handshake action frame (e.g., a slot response handshake frame, in response to the slot handshake request frame, for slot assignment).

In some embodiments, the response message may be similar to the request message (e.g., structurally, operationally). In other embodiments, the response message may be different from the request message (e.g., structurally, operationally). In at least one field/IE of the response message, the device (e.g., first device 401 and/or second device 402) may configure a response latency marker (response L-marker) with a value (e.g., a response value) to identify/indicate/classify one or more traffic streams (e.g., as being latency sensitive or not). In other embodiments, the response message may include a different/separate marker using a response value to identify one or more traffic streams using a different characteristic/attribute of the traffic stream.

The second device 402 may manage (e.g., use for scheduling traffic streams) the information extracted from the response L-marker in the response message. In some embodiments, if the second device 402 is an AP, the second device 402 may schedule downlink traffic (or peer-to-peer traffic) to be transmitted from the first device 401 (e.g., a STA). In some embodiments, if the second device 402 is a STA, the second device 402 may schedule uplink traffic (or peer-to-peer traffic) to be transmitted from the first device 401 (e.g., an AP, a different STA).

In some embodiments, the response L-marker generated for the response message may be identical or similar to the L-marker generated in the request message (e.g., structurally, operationally, such as using a defined IE, field and/or bitmap format). The response values may be responses corresponding to (e.g., matching) the request values in the L-marker generated in the request message. For instance, a request value may request a particular TID stream be identified as latency sensitive traffic, and a response value may accept the request by mirroring the request values of the request message. If the response values of the response value L-marker do not mirror or match the request values of the L-marker, then the requested information may be rejected (partially rejected, for one or more of the identified traffic streams, or wholly rejected for all identified traffic streams). For example, a particular traffic stream may not be denoted as a latency sensitive traffic stream for slot scheduling purposes, as indicated in the corresponding response value of the response L-marker. The traffic stream not denoted as a latency sensitive traffic stream may not receive (or be assigned to) prioritized slot(s) for communication.

In other embodiments, the response L-marker generated for the response message may be different from the L-marker generated in the request message (e.g., structurally, operationally, for example using a different format, IE or field). For example, a response L-marker may accept the request values indicated in the L-marker by communicating (with a response value, for instance) a one-bit response (instead of a multi-bit bitmap). For example, the response L-marker may be set to '1' (or '0') to accept the information associated with the L-marker of the request message.

In more details of operation 422, the second device 402 may transmit the response message to the first device 401. For example, the second device 402 may transmit the response message as part of a slot request-response handshake process.

In more details of operation 407, the first device 401 may receive, from the second device 402, the response message. The response message may be received in response (in part) to the request message communicated to the second device 402. The first device 401 may extract information from the response message, including a response L-marker (or L-markers) and any response values, and determine whether the L-marker and corresponding request values of the request message were (partially or completely) approved, rejected, and/or modified.

For example, the first device 401 may determine that the second device 402 approved the L-marker in the request message if the response L-marker in the response message is the same as the L-marker in the request message. In a different example, the first device 401 may determine that the second device 402 modified (or rejected) the L-marker (or L-markers) in the request message if the response L-marker (or L-markers) in the response message is at least partially different. If the second device 402 modified the L-marker, in some embodiments, the first device 402 may approve/accept/re-request (e.g., automatically or by default) the newly modified L-marker designations. For example, the first device 401 may transmit a mirrored/matching L-marker (or L-markers) back to the second device 402 (not shown). In some embodiments, the response message from the second device can include (in addition to a response L-Marker, or in place of a response L-marker) an indication (e.g., in a status field) for example indicating success (e.g., the second device accepted/approved the L-marker), a rejection with suggested change(s) to the L-marker information, or a rejection (without suggested changes). The first device, responsive to receiving the indication and/or the response message, can decide/determine whether to send a further request message (e.g., a re-request, with or without the suggested change(s). In some embodiments, the first device may decide to give up or drop its request responsive to the indication (e.g., if the second device indicates a rejection in the response message). For example, the first device 401 may give up its request to seek/identify particular latency sensitive traffic stream(s), in some implementations, if the second device provides a partial or complete rejection.

Referring back to operation 407, the first device 401 may initiate a process according to the response message. For example, the first device 401 may schedule the traffic streams identified in the response message as latency sensitive traffic streams (e.g., approved/accepted by the second device 402 in the request message as latency sensitive traffic streams), to time slots that are prioritized, and may communicate these traffic streams as prioritized traffic streams instead of a regular traffic stream. Communicating the traffic streams as prioritized (or latency sensitive) traffic streams may include transmitting the traffic streams using prioritized slot(s), prioritized time duration(s), prioritized symbols, prioritized carrier(s), and the like. That is, the first device 401 may differentiate the prioritized traffic stream from a regular traffic stream.

Figure 5:
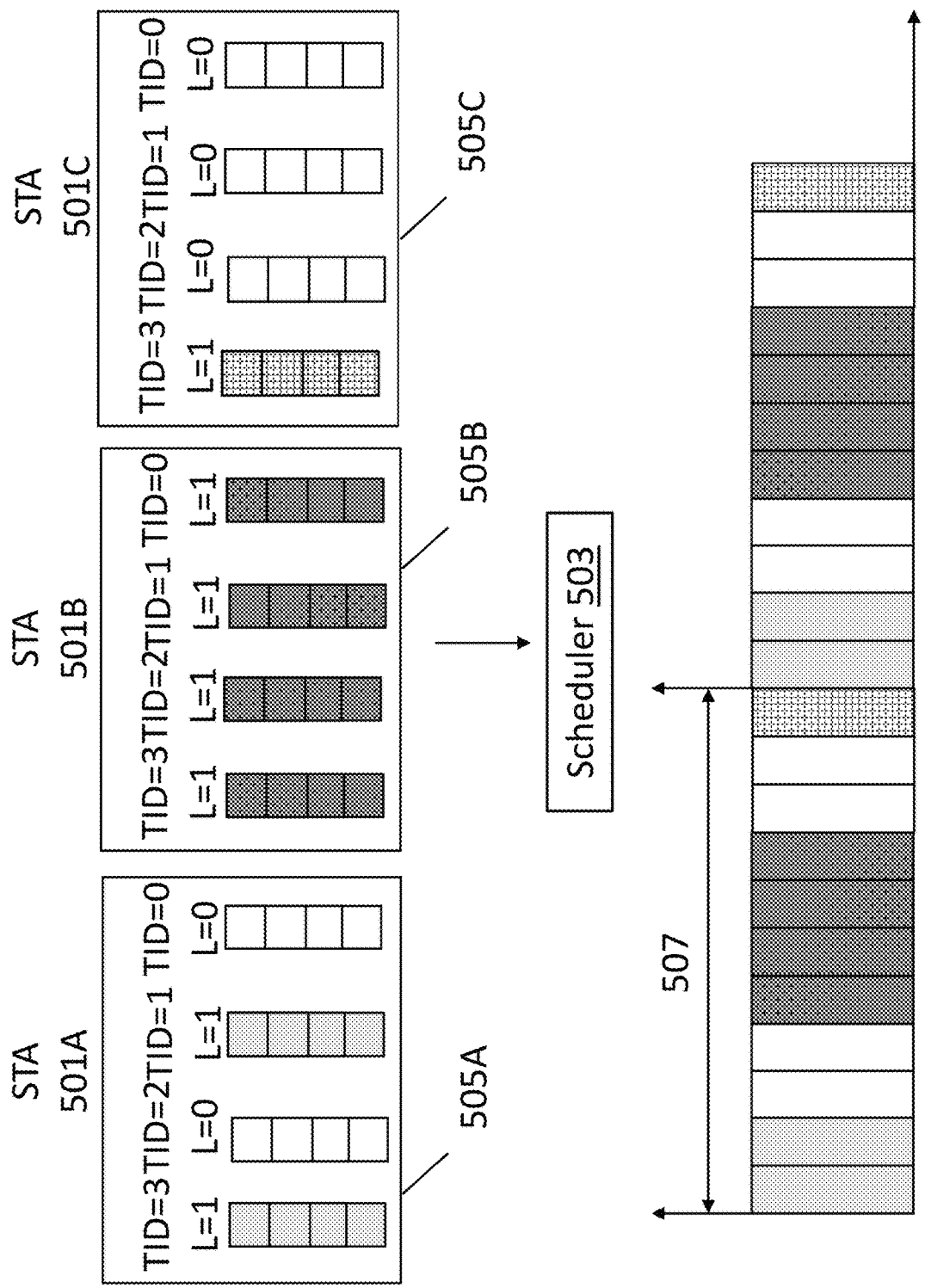
FIG. 5 is an example scheduling diagram based on information extracted from a latency marker (L-marker), according to an example implementation of the present disclosure.

FIG. 5 is an example scheduling diagram based on information extracted from an L-marker (e.g., a response L-marker from an access point), according to an example implementation of the present disclosure. In some embodiments, devices (such as STA 501A, 501B and 501C, referred to herein as "STAs 501") may have latency sensitive traffic to communicate with the access point. Each STA 501 may have different traffic streams, and some of these is/are to be prioritized to meet latency requirements. Each traffic stream to be communicated by each of the STAs 501 may include latency sensitive traffic or non-latency sensitive traffic (e.g., regular traffic, non-prioritized traffic).

An L-marker may correspond to each stream of traffic. For example, as shown in STA 501A, a stream of traffic may correspond to TID 3 and be identified as latency sensitive traffic (e.g., the L-marker is set to '1'). Another stream of traffic may correspond to TID 2 and be identified as regular traffic (e.g., the L-marker is set to '0'). Another stream of traffic may correspond to TID 1 and be identified as latency sensitive traffic (e.g., the L-marker is set to '1').

Another stream of traffic may correspond to TID 0 and be identified as regular traffic (e.g., the L-marker is set to '0').

As shown, each STA 501 may have one or more traffic streams to transmit. The traffic (traffic streams) to be transmitted may be queued by the STA 501. For example, STA 501A may queue and seek to transmit traffic 505A, STA 501B may queue and seek to transmit traffic 505B, and STA 501C may queue and seek to transmit 505C. Each of the STAs 501 may communicate the traffic they seek to transmit according to traffic stream information (e.g., TIDs) and L-markers (e.g., conveyed by the access point). For example, the STAs 501 may transmit request messages (as described in operation 403 and 420 in FIG. 4) containing L-markers to a scheduler 503 (e.g., schedule 190A in FIG. 1). The scheduler 503 (e.g., of an AP, a soft AP, a console 110) may receive the request message and may agree to the traffic designations requested by STAs 501. Accordingly, slots of a service period 507 may be scheduled with prioritized traffic (e.g., latency sensitive traffic) and non-prioritized traffic (e.g., regular traffic).

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 316 can provide various functionality for computing system 314, including any of the functionality described herein as being performed by a server or client, or other functionality associated with message management services.

It will be appreciated that computing system 314 is illustrative and that variations and modifications are possible. Computer systems used in connection with the present disclosure can have other capabilities not specifically described here. Further, while computing system 314 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
    sending, by a first wireless communication device to a second wireless communication device, a request message comprising a latency marker having a requested value indicating that a corresponding traffic stream between the first wireless communication device and the second wireless communication device is latency sensitive; and
    receiving, by the first wireless communication device from the second wireless communication device responsive to the request message, a response message comprising a response latency marker with a response value indicating whether the corresponding traffic stream between the first wireless communication device and the second wireless communication device is latency sensitive;
    comparing the response value and the requested value;
    determining, by the first wireless communication device based on a result of the comparing, that the request message has been accepted; and
    communicating, by the first wireless communication device with the second wireless communication device responsive to the determining, the corresponding traffic stream as a prioritized traffic stream instead of a regular traffic stream, wherein the request message includes a traffic stream identifier (TID) of the corresponding traffic stream, and the requested value is configured for the TID of the corresponding traffic stream, wherein the latency marker comprises a bitmap, each bit of the bitmap indicating whether a corresponding traffic stream between the first wireless communication device and the second wireless communication device is latency sensitive.

2. The method of claim 1, wherein the corresponding traffic stream has a specific direction between the first wireless communication device and the second wireless communication device, and the requested value is configured for the specific direction.

3. The method of claim 1, wherein the latency marker has a first requested value indicating whether a first traffic stream of a first direction between the first wireless communication device and the second wireless communication device is latency sensitive, and a second requested value indicating whether a second traffic stream of a second direction between the first wireless communication device and the second wireless communication device is latency sensitive.

4. The method of claim 1, wherein the request message is to establish a block acknowledgement (BA) session, and the latency marker is 1 bit in size.

5. The method of claim 1, wherein the latency marker comprises a plurality of requested values each indicating whether a corresponding traffic stream between the first wireless communication device and the second wireless communication device is latency sensitive.

6. The method of claim 5, wherein the response latency marker comprises a plurality of response values each responsive to a corresponding one of the plurality of requested values.

7. The method of claim 1, wherein the latency marker comprises a first bitmap indicating whether each of a first plurality of traffic streams with a first direction between the first wireless communication device and the second wireless communication device is latency sensitive, and a second bitmap indicating whether each of a second plurality of traffic streams with a second direction between the first wireless communication device and the second wireless communication device is latency sensitive.

8. The method of claim 5, wherein at least one of the latency marker or the response latency marker is configured in or as an information element.

9. The method of claim 5, wherein at least one of: the latency marker is carried in a field of the request message, or the response latency marker is carried in a field of the response message.

10. A first wireless communication device, comprising:
a transceiver comprising at least one processor, configured to:
send to a second wireless communication device a request message comprising a latency marker having a requested value indicating that a corresponding traffic stream between the first wireless communication device and the second wireless communication device is latency sensitive; and
receive, from the second wireless communication device responsive to the request message, a response message comprising a response latency marker with a response value indicating whether the corresponding traffic stream between the first wireless communication device and the second wireless communication device is latency sensitive;
compare the response value and the requested value;
determine, based on a result of the comparing, that the request message has been accepted; and
communicate, with the second wireless communication device responsive to the determining, the corresponding traffic stream as a prioritized traffic stream instead of a regular traffic stream,
wherein the request message includes a traffic stream identifier (TID) of the corresponding traffic stream, and the requested value is configured for the TID of the corresponding traffic stream,
wherein the latency marker comprises a bitmap, each bit of the bitmap indicating whether a corresponding traffic stream between the first wireless communication device and the second wireless communication device is latency sensitive.

11. The first wireless communication device of claim 10, wherein the corresponding traffic stream has a specific direction between the first wireless communication device and the second wireless communication device, and the requested value is configured for the specific direction.

12. The first wireless communication device of claim 10, wherein the latency marker has a first requested value indicating whether a first traffic stream of a first direction between the first wireless communication device and the second wireless communication device is latency sensitive, and a second requested value indicating whether a second traffic stream of a second direction between the first wireless communication device and the second wireless communication device is latency sensitive.

13. The first wireless communication device of claim 10, wherein the request message is to establish a block acknowledgement (BA) session, and the latency marker is 1 bit in size.

14. The first wireless communication device of claim 10, wherein the latency marker comprises a plurality of requested values each indicating whether a corresponding traffic stream between the first wireless communication device and the second wireless communication device is latency sensitive.

15. The first wireless communication device of claim 14, wherein the response latency marker comprises a plurality of response values each responsive to a corresponding one of the plurality of requested values.

16. The first wireless communication device of claim 1, wherein the latency marker comprises a first bitmap indicating whether each of a first plurality of traffic streams with a first direction between the first wireless communication device and the second wireless communication device is latency sensitive, and a second bitmap indicating whether each of a second plurality of traffic streams with a second direction between the first wireless communication device and the second wireless communication device is latency sensitive.

* * * * *